March 7, 1967    L. B. THWAITES    3,307,829
APPARATUS TO TRANSFER A POWER-OPERATED IMPLEMENT BETWEEN
A TRACTOR CHASSIS FRAME AND THE GROUND
Filed Dec. 16, 1964

3,307,829
APPARATUS TO TRANSFER A POWER-OPERATED IMPLEMENT BETWEEN A TRACTOR CHASSIS FRAME AND THE GROUND
Leslie B. Thwaites, c/o The Thwaite Engineering Company Limited, Welch Road Works, Cubbington, near Leamington Spa, Warwickshire, England
Leamington Spa, England
Filed Dec. 16, 1964, Ser. No. 418,810
Claims priority, application Great Britain, Dec. 18, 1963, 49,913/63; Jan. 3, 1964, 318/64
5 Claims. (Cl. 254—88)

The invention relates to a stand for transferring an implement, of the kind which has a power-operated tool capable of engaging the ground and a frame that is adapted to be secured during use of the chassis frame of a tractor, between the chassis frame and the ground. The word "tractor" is used to define a dirigible self-propelled vehicle, such as a dumper or an agricultural tractor, which is provided with attachment means for carrying a power-operated tool. In particular, but not exclusively, the invention is concerned with the combination of a dumper with an excavator such as that disclosed in specification No. 258,561, now Patent No. 3,243,064. Whilst a dumper has proved to be a very versatile piece of equipment in that it can be used alternatively to carry a skip or an excavator, the operation of removing one implement and replacing it with another implement has hitherto proved to be difficult and time consuming. It is an object of this invention to provide apparatus for facilitating the detachment and subsequent replacement of an implement, such as an excavator, on the chassis frame of a tractor.

The primary object of the invention is to transfer an implement, of the kind which has a power-operated tool capable of engaging the ground and a frame that is adapted to be carried during use from the chassis frame of a tractor, from the chassis frame to the ground, by placing a stand for the implement on the ground, driving the wheels of the tractor which are nearest to the implement on to the stand for the frame of the implement to co-operate with the stand so that the weight of the implement is transferred from the chassis frame of the tractor to the stand, causing the power-operated tool to engage the ground, and then completely disconnecting the points of attachment between the implement and the tractor whereby, after the tractor is driven away from the implement, the implement is supported from the ground by its frame bearing on the stand and by the tool bearing on the ground, and the attachment points of the implement are stably supported relatively to the stand for convenient re-connection with the corresponding attachment points of the, or another, tractor. Preferably the wheels of the tractor nearest to the implement are guided by the stand into a particular position whereby to ensure that, when the tractor returns for re-connection to the implement, the implement mounting points will be accurately aligned with the corresponding attachment points of the tractor.

The stand may include a portable rigid frame provided with two parallel tracks for engagement by the tractor wheels nearest to the implement, an upstanding flange arranged on one side of each track for guiding the wheels, at least one ramp secured to the frame in a position parallel to the tracks with its inclined surface extending upwardly away from the entrances to the tracks, and a horizontal platform arranged at the top of the ramp whereby, when the tractor wheels nearest to the implement are driven on to the tracks, the ramp will engage the implement frame and lift the latter vertically until it rests on the horizontal platform which will then support the weight of the implement.

The invention is now described, by way of example only, with reference to the accompanying drawings, in which.

Figure 1:
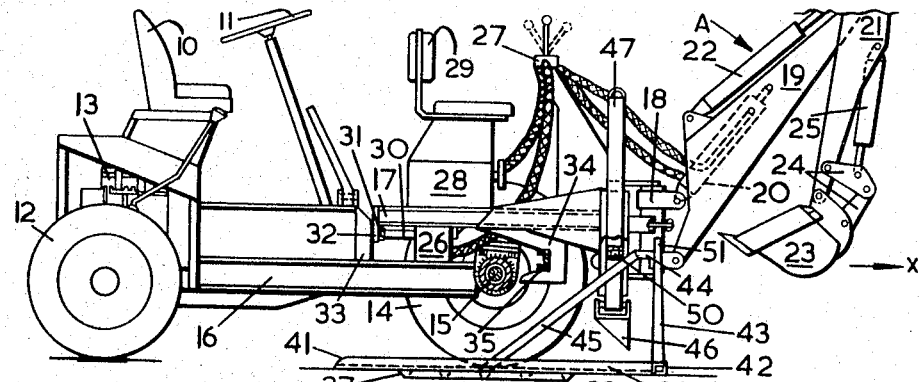
FIGURE 1 is a side elevation of a dumper carrying an excavator on to a stand, but showing the off-side front wheel, off-side front jack and part of the chassis frame broken away.

As will be readily appreciated from FIGURE 1, the dumper is provided with a seat 10, a steering column 11 for steering the rear wheels 12, and an engine 13 for driving the front wheels 14 through a differential axle 15 which is rigidly secured to the chassis frame 16. The excavator is indicated generally by arrow A and has been extensively described in specification No. 258,561, now Patent No. 3,243,064. In general, the excavator has a frame 17 which supports a slewing frame 18 to the bottom of which is pivoted the main boom 19. A ram 20 for raising and lowering the main boom is connected between the top of the slewing frame and the middle portion of the main boom. A tool beam 21 is pivoted to the outer end of the main boom, being operated by a ram 22, and a bucket 23 is connected to the outer end of the tool beam 21 by links 24 for actuation by the ram 25. The rams 20, 22 and 25 are operated by fluid under pressure from a pump 26 carried by the excavator frame 17, and are controlled by valves 27. A reservoir 28 for the operating fluid is mounted on the frame 17 and is provided with a seat 29 for the excavator operator. As will be appreciated from FIGURE 1, the pump 26 is driven from the engine 13 through a detachable drive coupling 30 and the frame 17 of the excavator is secured to the chassis frame 16 of the dumper by bolts 31 which hold a flange 32 of the excavator frame 17 to an upright 33 of the chassis frame 16, and by a hook 34 which engages a cross member 35 of the chassis frame 16. Thus, by undoing the bolts 31 and by detaching the drive coupling 30, the excavator can be detached from the dumper by disengaging the hook 34 from the cross member 35.

When it is desired to detach the excavator, a stand 36 is placed, in accordance with the method of the invention, on the ground in front of the dumper and the latter is driven on to the stand as indicated in FIGURE 1. The construction of the stand 36 will be seen from FIGURE 2 to be a rigid frame provided with two parallel tracks 37 for engagement by the front wheels 14 of the tractor. The tracks 37 are formed from five transverse lengths of angle-iron 38 which are welded to end plates 39 and to two longitudinal lengths of angle-iron 40. The latter provide an upstanding flange on the inside of each track 37 for guiding the wheels 14, and have their one ends 41 turned in to prevent the tyres of wheels 14 from being damaged and their other ends braced by a transverse box-sectioned member 42. A pair of pillars 43 are welded at their bottoms to the members 42 and at their tops to respective horizontal platforms 44 which merge into ramps 45 that slope downwardly towards the turned in ends 41 of the lengths of angle-iron 40 and are welded at their bottoms to the centre length of angle-iron 38.

Figure 3:
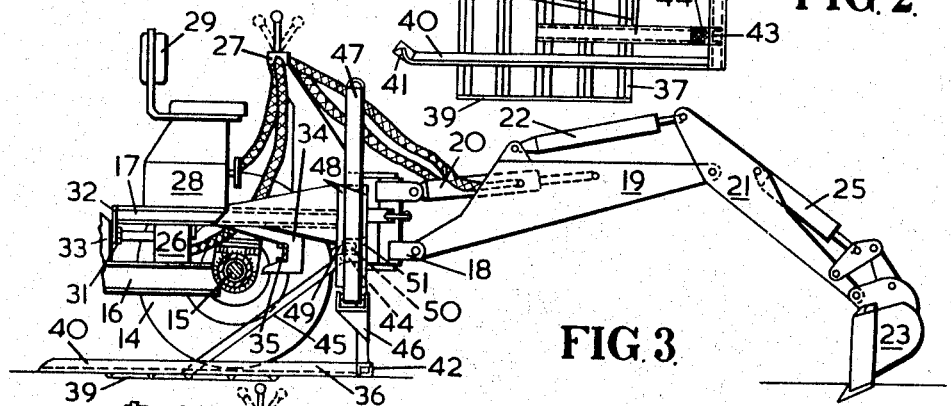
FIGURE 3 is a side elevation of the dumper and excavator shown in FIGURE 1, but indicating the transfer of the excavator from the dumper, of which the rear portion has been broken away.
Figure 4:
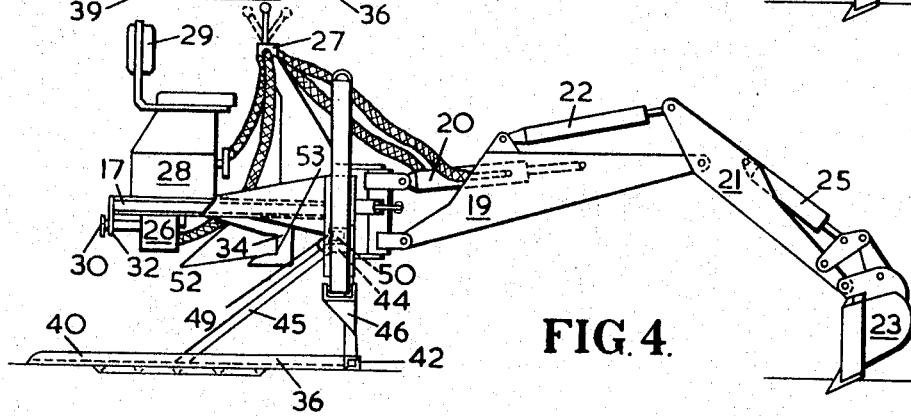
FIGURE 4 is a side elevation of the excavator which is shown supported from its stand.

A pair of jack feet 46, of which the off-side front one is cut away in FIGURE 1 but is shown in FIGURES 3 and 4, are arranged one at each lateral side of the excavator frame 17 and are carried by respective legs 47 which are slidable in vertical guides 48, as will be seen from FIGURE 3, fast with the excavator frame 17 and can be locked in a plurality of vertically adjusted positions by respective pins 49. The vertical guides 48 are braced apart by a transverse box-section member 50 of the excavator frame 17.

Figure 2:
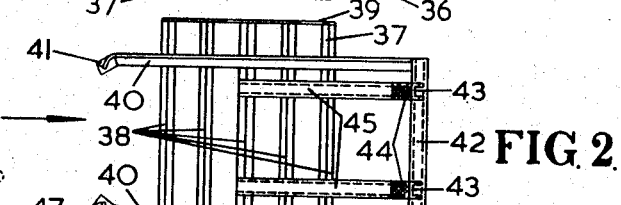
FIGURE 2 is a plan view of the stand shown in FIGURE 1.

To detach the excavator from the dumper, the latter is driven forwards towards the stand for its front wheels 14 to engage the tracks 37 and for the member 50 of the excavator frame to engage the ramps 45 before the dumper has stopped moving as indicated by arrow X in FIGURE 1. The momentum of the dumper and the excavator will then cause the member 50 to ride up the ramps 45 until it rests on the horizontal platforms 44 as shown in FIGURE 2. The transverse spacing between the pillars 43 is less than the spacing between the jack feet 46 so that the latter straddle the ramps 45 as indicated in FIGURES 3 and 4. Upstanding ends 51 of the pillars 43 prevent the member 40 from being pushed off the platforms 44 by any residual momentum. It will, of course, be appreciated that the height of the platforms 44 above the level of member 50 is arranged to be substantially equal to the difference in the height of the dumper chassis frame 16 between its unladen condition and its condition of carrying the excavator, whereby the stand 36 will support the whole weight of the excavator when the member 50 is resting on the platforms 44. Whilst in the position shown in FIGURE 3, the valves 27 are actuated to cause the excavator bucket 23 to engage the ground and thus support the moment of main boom 19, tool beam 21 and bucket 23 about the member 50, the bolts 31 are undone and the drive coupling 30 is detached so that the dumper may be driven away for other duties leaving the excavator in the condition shown in FIGURE 4 in which it is supported by the engagement of the bucket 23 with the ground and of the member 50 with the horizontal platforms 44 of the stand 36.

In use, the stand 36 prevents the excavator from sinking into the ground, and its tracks 37 maintain the flanges 32 and the hook 34 at the correct height for re-attachment to the dumper. The tracks 37 of the stand also guide the wheels 14 into the correct direction for re-attachment to the excavator, and the flanges 40 ensure that the flanges 32 are transversely aligned with the upright 33 for aligning the holes for bolts 31.

As will be appreciated from FIGURE 4 the weight of the main boom 19 and for the tool beam 21 more than counterbalances the cantilevered weight of the reservoir 28 and pump 26, the resultant unbalance being resisted by the engagement of the bucket 23 with the ground. As the hydraulic connections are not disturbed when the excavator is removed from the dumper, the rams 20, 22 and 25 can be hydraulically locked by the valves 27 to hold the main boom 19, the tool beam 21, and the bucket 23 rigidly in the positions shown. However, if it is desired to alter the lengths of the rams this can be achieved by operating the valves 27 and either by allowing the previously-mentioned overbalance to act on the rams, or by lifting on the main boom or pressing down on the frame 17 to overcome the said overbalance and cause the resultant force to act on the rams in the opposite direction. In this manner the excavator can be rocked about a line passing through the member 50 for the positions of the flanges 32 and the hook 34 to be adjusted in the vertical plane to cater for any misalignment between the dumper and the excavator caused, say, by varying tyre pressures.

Preferably the hook 34 is arranged, as will be best seen in FIGURE 4, so that its throat 53 which is for receiving the cross member 35 is provided with an inwardly-converging mouth 52. Thus, when the, or another, dumper is driven on to the stand 36 for attachment to the excavator, any slight vertical misalignment between the cross member 35 of the dumper chassis frame and the throat 53 of hook 34 will cause the cross member 35 to engage one side of the mouth 52 which will then guide the cross member 35 into throat 53 as the dumper is driven towards the stand 36.

The aforesaid slight vertical misalignment is frequently caused by the wearing of and variations of pressure in tyres 14, and slight variations in the height of the cross member 35 between different dumpers due to normal engineering tolerances.

What I claim as my invention and desire to secure by Letters Patent of the United States is:

1. A stand for use in transferring a power-operated implement, having a frame carried during use by the chassis frame of a tractor, from the tractor chassis frame to the ground, comprising a portable rigid planar frame, guide means secured to said frame, said guide means adapted to direct a wheel of said tractor into a particular direction across said frame, a ramp secured to said frame lying in a vertical plane parallel with said guide means, said ramp adapted to engage said implement frame when a wheel of said tractor is engaged by said guide means, means for inhibiting movement of said implement frame down said ramp under its own weight, and abutment means secured to said frame for preventing the implement frame from being pushed off the top of the ramp in the direction of its upward slope by the tractor.

2. A stand for use in transferring a power-operated implement, having a frame carried during use by the chassis frame of a tractor, from the tractor chassis frame to the ground, comprising a portable rigid planar frame, guide means secured to said frame, said guide means adapted to direct a wheel of said tractor into a particular direction across said frame, a ramp secured to said frame lying in a vertical plane parallel with said guide means, said ramp adapted to engage said implement frame when a wheel of said tractor is engaged by said guide means, a horizontal platform secured to the top of said ramp for coaction with said implement frame, and abutment means secured to said frame for preventing the implement frame from being pushed off the said horizontal platform away from the ramp by the tractor.

3. A stand for use in transferring a power-operated implement, having a frame carried during use by the chassis frame of a tractor, from the tractor chassis frame to the ground, comprising a portable rigid planar frame, two parallel guide tracks secured to said frame, said guide tracks adapted to direct the wheels of said tractor nearest said implement into a particular direction across said frame, a ramp secured to said frame lying in a vertical plane parallel with said guide tracks, said ramp adapted to engage said implement frame when the wheels of said tractor are engaged by said guide tracks, means for inhibiting movement of said implement frame down said ramp under its own weight, and abutment means secured to said frame for preventing the implement frame from being pushed off the top of the ramp in the direction of its upward slope by the tractor.

4. A stand for use in transferring a power-operated implement, having a frame carried during use by the chassis frame of a tractor, from the tractor chassis frame to the ground, comprising a portable rigid planar frame, two parallel guide tracks secured to said frame, said guide tracks adapted to direct the wheels of said tractor nearest said implement into a particular direction across said frame, a pair of parallel ramps secured to said frame parallely between said guide tracks, said ramps having their inclined surfaces coplanar, said ramps adapted to engage said implement frame when the wheels of said tractor are engaged by said guide tracks, a horizontal platform secured to the top of each of said ramps for coaction with said implement frame, and abutment means secured to said frame for preventing the implement frame from being pushed off the said horizontal platforms away from the ramps by the tractor.

5. A stand as in claim 4, in which the abutment means comprises a pair of upstanding vertical stops secured one to each of the horizontal platforms remote from their junction with the ramps.

References Cited by the Examiner
UNITED STATES PATENTS

| | | |
|---|---|---|
| 1,237,297 | 8/1917 | Capron. |
| 1,792,055 | 2/1931 | Young _____ 214—39 |
| 2,833,432 | 5/1958 | Foster _____ 214—131 |
| 3,034,587 | 5/1962 | Dorkins et al. _____ 214—131 X |

HUGO O. SCHULZ, *Primary Examiner.*